United States Patent
Gieshoff et al.

(10) Patent No.: US 12,516,675 B2
(45) Date of Patent: Jan. 6, 2026

(54) CONVEYING A FLUID CONTAINING A (METH)ACRYLIC MONOMER BY MEANS OF A PUMP

(71) Applicant: BASF SE, Ludwigshafen am Rhein (DE)

(72) Inventors: Tile Gieshoff, Ludwigshafen am Rhein (DE); Juergen Schroeder, Ludwigshafen am Rhein (DE); Ulrich Hammon, Ludwigshafen am Rhein (DE); Christian Rein, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 210 days.

(21) Appl. No.: 18/034,889

(22) PCT Filed: Nov. 2, 2021

(86) PCT No.: PCT/EP2021/080297
§ 371 (c)(1),
(2) Date: May 2, 2023

(87) PCT Pub. No.: WO2022/096422
PCT Pub. Date: May 12, 2022

(65) Prior Publication Data
US 2023/0400016 A1    Dec. 14, 2023

(30) Foreign Application Priority Data
Nov. 3, 2020    (EP) .................................... 20205447

(51) Int. Cl.
*F04D 29/046*    (2006.01)
*C08F 220/06*    (2006.01)
(Continued)

(52) U.S. Cl.
CPC ............ *F04D 29/046* (2013.01); *F04B 15/00* (2013.01); *F04D 13/026* (2013.01); *F04D 13/06* (2013.01);
(Continued)

(58) Field of Classification Search
CPC .. F04D 29/061; F04D 29/046; F04D 13/0633; F04D 29/5806; F04D 13/06;
(Continued)

(56) References Cited

U.S. PATENT DOCUMENTS

| | | | |
|---|---|---|---|
| 2,956,841 A | 10/1960 | Cammeti et al. | |
| 5,549,459 A | 8/1996 | Nixon | |

(Continued)

FOREIGN PATENT DOCUMENTS

| | | |
|---|---|---|
| DE | 29610799 U1 | 2/1997 |
| DE | 10224341 A1 | 7/2003 |

(Continued)

OTHER PUBLICATIONS

International Search Report and Written Opinion received for PCT Patent Application No. PCT/EP2021/080297, mailed on Jan. 27, 2022, 23 pages (11 pages of English Translation and 12 pages of Original Document).

(Continued)

*Primary Examiner* — Peter J Bertheaud
(74) *Attorney, Agent, or Firm* — Faegre Drinkder Biddle & Reath LLP

(57) ABSTRACT

The present invention relates to a method for transporting a liquid F by means of a pump P, wherein the liquid F comprises at least 10% by weight of a (meth)acrylic monomer, the pump P has a pump space (3), the pump space (3) comprises at least one transport element (4) for transporting the liquid F, the transport element (4) is connected to a drive shaft (6) in such a way that the drive shaft (6) can transmit (Continued)

a torque to the transport element (4), the mounting of the drive shaft is effected by means of at least two sliding bearings (5) in the pump space (3) and the sliding bearings (5) are composed of tungsten carbide.

15 Claims, 1 Drawing Sheet

(51) Int. Cl.
    *F04B 15/00*     (2006.01)
    *F04B 17/03*     (2006.01)
    *F04D 13/02*     (2006.01)
    *F04D 13/06*     (2006.01)
    *F04D 29/06*     (2006.01)
    *F04D 29/12*     (2006.01)
    *F04D 29/58*     (2006.01)
    *F04D 29/62*     (2006.01)

(52) U.S. Cl.
    CPC ..... *F04D 13/0606* (2013.01); *F04D 13/0633* (2013.01); *F04D 29/061* (2013.01); *F04D 29/126* (2013.01); *F04D 29/5806* (2013.01); *F04D 29/628* (2013.01); *C08F 220/06* (2013.01); *F04B 17/03* (2013.01)

(58) Field of Classification Search
    CPC .. F04D 13/0606; F04D 13/026; F04D 29/628; F04D 29/126; F04D 15/00
    See application file for complete search history.

(56) References Cited

U.S. PATENT DOCUMENTS

| | | | |
|---|---|---|---|
| 5,674,057 A | 10/1997 | Guardiani et al. | |
| 6,454,541 B1 * | 9/2002 | Ijiri | F04D 13/0606 |
| | | | 415/111 |
| 7,284,951 B2 * | 10/2007 | Diehl | F04D 29/126 |
| | | | 415/113 |
| 2005/0232782 A1 | 10/2005 | Diehl et al. | |
| 2006/0245955 A1 * | 11/2006 | Horiuchi | F04D 13/026 |
| | | | 417/420 |
| 2015/0260191 A1 | 9/2015 | Blankemeier et al. | |

FOREIGN PATENT DOCUMENTS

| | | |
|---|---|---|
| DE | 10228859 A1 | 1/2004 |
| DE | 60037560 T2 | 12/2008 |
| EP | 0740079 A1 | 10/1996 |

OTHER PUBLICATIONS

Ernst Bartholome, "Verfahrenstechnik ll und Reaktionsapparate", Ullmanns Encyklopädie der technischen Chemie-Verlag Chemie, 4th Edition, vol. 3, 1973, pp. 155 to 184.

* cited by examiner

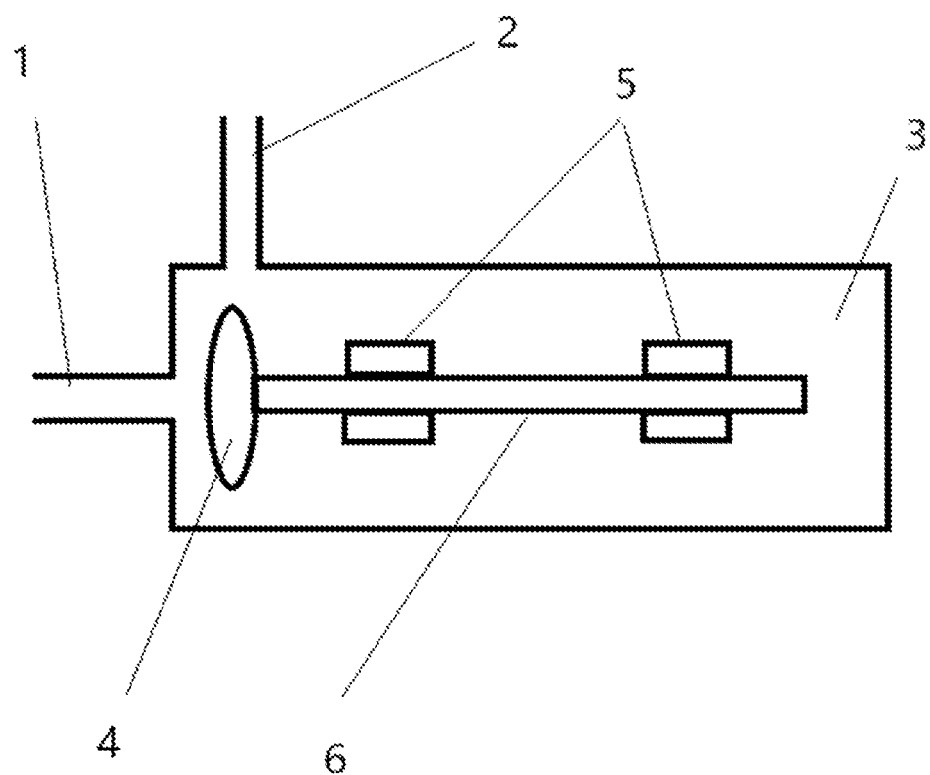

CONVEYING A FLUID CONTAINING A (METH)ACRYLIC MONOMER BY MEANS OF A PUMP

CROSS-REFERENCE TO RELATED APPLICATIONS

This application is a National stage application (under 35 U.S.C. § 371) of PCT/EP2021/080297, filed Nov. 2, 2021, which claims benefit of European Application No. 20205447.4, filed Nov. 3, 2020, both of which are incorporated herein by reference in their entirety.

BRIEF SUMMARY OF THE INVENTION

The present invention relates to a method for transporting a liquid F by means of a pump P, wherein the liquid F comprises at least 10% by weight of a (meth)acrylic monomer, the pump P has a pump space (3), the pump space (3) comprises at least one transport element (4) for transporting the liquid F, the transport element (4) is connected to a drive shaft (6) in such a way that the drive shaft (6) can transmit a torque to the transport element (4), the mounting of the drive shaft is effected by means of at least two sliding bearings (5) in the pump space (3) and the sliding bearings (5) are composed of tungsten carbide.

In the present text, the expression (meth)acrylic monomers is used as an abbreviation for "acrylic monomers and/or methacrylic monomers".

The expression acrylic monomer is in this text used as an abbreviation for acrylic acid, esters of acrylic acid and/or acrylonitrile.

The expression methacrylic monomer is used in this text as an abbreviation for methacrylic acid, esters of methacrylic acid and/or methacrylonitrile.

In particular, the (meth)acrylic monomers addressed in this text are intended to encompass the following (meth)acrylic esters hydroxyethyl acrylate, hydroxyethyl methacrylate, hydroxypropyl acrylate, hydroxypropyl methacrylate, glycidyl acrylate, glycidyl methacrylate, methyl acrylate, methyl methacrylate, n-butyl acrylate, n-butyl methacrylate, tert-butyl acrylate, tert-butyl methacrylate, ethyl acrylate, ethyl methacrylate, 2-ethylhexyl acrylate, 2-ethylhexyl methacrylate, N,N-dimethylaminoethyl acrylate and N,N-dimethylaminoethyl methacrylate.

(Meth)acrylic monomers are important starting compounds for the production of polymers which are used, for example, as adhesives.

(Meth)acrylic acid is produced industrially predominantly by catalytic gas-phase oxidation of suitable $C_3/C_4$ precursor compounds, in particular propene and propane in the case of acrylic acid and isobutene and isobutane in the case of methacrylic acid. Not only propene, propane, isobutene and isobutane but also other compounds comprising 3 or 4 carbon atoms, for example isobutanol, n-propanol or the methyl ether of isobutanol, are suitable as starting materials.

A product gas mixture from which the (meth)acrylic acid has to be separated off by absorptive, rectificative, extractive and/or crystallizative methods is normally obtained (cf. for example DE 102 24 341 A). In an analogous way, (meth)acrylonitrile is obtainable by catalytic ammoxidation of the abovementioned $C_3/C_4$ precursor compounds and subsequent separation from the product gas mixture.

Esters of (meth)acrylic acid are obtainable by, for example, direct reaction of (meth)acrylic acid with the corresponding alcohols. However, product mixtures from which the (meth)acrylic esters have to be separated off by, for example, rectification and/or extraction are firstly obtained in this case.

It is every now and again necessary, especially in connection with the abovementioned separations, to convey/transport (meth)acrylic monomers in more or less pure form or in solution (in this text generally referred to as liquids F comprising (meth)acrylic monomers).

The solvent here can be either aqueous or an organic solvent. The specific type of solvent is essentially immaterial in the context of the invention. The content of (meth)acrylic monomers in solutions to be transported can be ≥20% by weight, or ≥40% by weight, or ≥60% by weight, or ≥80% by weight, or ≥90% by weight, or ≥95% by weight, or ≥99% by weight.

In the course of this transport, height differences and/or flow resistances have to be overcome. This can be achieved only by energy being introduced into the liquid to be transported. This is usually achieved by means of flow machines, also referred to as pumps.

Ullmanns Encyklopädie der technischen Chemie, 4th edition, volume 3, pages 155 to 184, Verlag Chemie 1973, describes a number of pumps which can be used for transporting liquids. However, not every pump is suitable for transporting liquids F comprising (meth)acrylic monomers (e.g. such (meth)acrylic monomers in more or less pure form or in solution). This is attributable to the fact that (meth)acrylic monomers are firstly not entirely unproblematical from a toxicologic point of view and secondly can easily be made to undergo free-radical polymerization by heat.

The pump to be used should therefore be such that it does not have any unintended exit positions, viz. leakage points, for the liquid F which comprises at least one (meth)acrylic monomer and is to be transported apart from the intended inlet and outlet. However, it should at the same time be such that undesirable free-radical polymerization of the (meth)acrylic monomers on mechanically stressed components (e.g. bearings of drive shafts) is prevented.

DE 102 28 859 A therefore recommends, in FIG. 1 therein, use of a transport pump which comprises a pump space (3), a drive space (5) and a separation space (4) separating the pump space and the drive space from one another, where the separation space (4) is filled with a barrier medium, the drive shaft has no bearing (8) within the pump space (3), the pressure of the barrier medium in the separation space (4) is greater than the pressure in the pump space (3) and than the pressure in the drive space (5), for transporting a liquid F comprising at least one (meth)acrylic monomer.

DETAILED DESCRIPTION OF THE INVENTION

It was an object of the present invention to provide a novel method for transporting a liquid F comprising at least one (meth)acrylic monomer by means of a transport pump, with undesirable free-radical polymerization of the (meth)acrylic monomers on mechanically stressed components (e.g. bearings of drive shafts) being prevented.

We have accordingly found a method for transporting a liquid F by means of a pump P, where the liquid F comprises at least 10% by weight of a (meth)acrylic monomer, the pump P has a pump space (3), the pump space (3) comprises at least one transport element (4) for transporting the liquid F, the liquid F is fed into the pump space (3) with an entry energy, the liquid F leaves the pump space (3) with an exit energy which is greater than the entry energy, the transport element (4) is connected to a drive shaft (6) in such a way that the drive shaft (6) can transmit a torque to the transport element (4) and the mounting of the drive shaft is effected by means of at least two sliding bearings (5) in the pump space (3), wherein the sliding bearings (5) are composed of tungsten carbide.

BRIEF DESCRIPTION OF THE DRAWINGS

FIG. 1 shows an embodiment according to the invention.

The reference numerals in parentheses relate to FIG. 1 of the present text, which shows a schematic depiction of a pump P to be used according to the invention. The reference numerals (1) and (2) denote the entry point and the exit point, respectively, of the liquid F into or from the pump P.

The liquid F preferably comprises at least 60% by weight, particularly preferably at least 80% by weight, very particularly preferably at least 90% by weight, of a (meth)acrylic monomer.

Preferred (meth)acrylic monomers are acrylic acid, methyl acrylate, ethyl acrylate, n-butyl acrylate, 2-ethylhexyl acrylate, 4-hydroxybutyl acrylate and cyclohexyl acrylate.

The temperature of the liquid is preferably from 10 to 120° C., particularly preferably from 40 to 100° C., very particularly preferably from 50 to 90° C.

The liquid F advantageously comprises a polymerization inhibitor, for example hydroquinone monomethyl ether, phenothiazine, 4-hydroxy-2,2,6,6-tetramethylpiperidin-1-oxyl, hydroquinone and N,N'-di-sec-butyl-p-phenylenediamine. The amount of polymerization inhibitor in the liquid F is preferably from 0.001 to 1% by weight, particularly preferably from 0.003 to 0.3% by weight, very particularly preferably from 0.01 to 0.1% by weight.

Pumps P which are preferred for the purposes of the invention are centrifugal pumps and side channel pumps.

Unlike reciprocating piston pumps and rotary piston pumps, which operate according to the displacement principle, centrifugal pumps and side channel pumps operate according to the dynamic principle. Work in the form of kinetic energy is transferred from a rotating impeller (the transport element connected to the drive shaft) to the liquid F to be transported. After the impeller, the kinetic energy is predominantly converted back into static pressure (pressure energy, Law of Conservation of Energy) in a stator and/or in the helical housing. The impeller is in principle a simple disk to which blades are attached.

The blades form blade channels whose cross section normally increases very greatly from the inside to the outside because of the increasing circumference. The same amount of liquid to be transported F as can flow into the middle of the impeller is able to be flung out through these blade channels. In contrast to a piston pump, the liquid to be transported F therefore flows permanently in the centrifugal pump and side channel pump during operation.

In contrast to the open impeller, closed impellers can also be used. The blade channels are here covered simply by a second disk which has an opening in the middle.

The curvature of the blades is generally like the natural path of a water droplet on a rotating round, smooth disk as seen by a corotating observer when the water droplet is allowed to fall onto the middle of the disk. This blade shape is referred to as "backward-curved" blade. However, it is in principle also possible to use slightly forward-curved blades and also screw-like blades, i.e. intrinsically twisted, backward-curved blades, the leading edges of which project into the impeller entry and capture the liquid F like a ship's propeller.

A centrifugal pump (a centrifugal pump space) comprises the pump housing and the impeller which rotates in the pump housing and is provided with blades. The liquid F enters axially through the suction port. It is diverted radially outward by the centrifugal force and in this way accelerated to a high velocity by the impeller. The pump housing has the task of collecting the liquid F from all blade channels so that it can in its entirety be conveyed further through the pressure outlets. However, the pump housing at the same time has the task of converting kinetic energy of the liquid F into pressure. This is generally achieved by exploiting the fact that an enlargement of the cross section reduces the speed of the liquid F and therefore brings about an increase in pressure. In order to increase the cross section, two structural designs of the pump housing are customary. In the case of single-stage pumps or multistage centrifugal pumps behind the last stage, helical housings are frequently employed. This encompasses the impeller in helical form. The cross section widens in the direction of the pressure outlet. The liquid F flowing through is slowed thereby, which means a simultaneous pressure increase.

Instead of the helix, fixed stators are also used, particularly in the case of multistage pumps. The stator is installed in the pump housing and configured as an annular space. It encloses the impeller. Guide vanes are arranged in the stator so as to form channels which continually widen toward the outside. In this embodiment, the liquid F is not flung directly into the pump housing but instead firstly flows through the blade channels of the stator. Due to the widening in the flow direction the flow velocity is again slowed and the pressure is increased thereby. The direction of the stator channels is normally opposite to the direction of the impeller channels and on the inner circumference of the stator corresponds to the direction of the exit velocity of the transported liquid from the impeller. A further task of the stator is, in the case of two-stage centrifugal pumps, to collect the liquid F and guide it to the entry of the second stage.

Of course, a combination of stator and helical housing can also be employed. This means the liquid F is firstly collected in the stator before it can go into the helical housing.

Depending on the shape of the impellers and thus the exit direction of the liquid F, a distinction is made between radial, semiaxial (also referred to as diagonal or screw wheel) and axial pumps (propeller pumps).

The pump space of the method of the invention can, however, also be configured as multistage centrifugal pump as has been described in Pumpen in der Feuerwehr, Part 1, Einführung in die Hydromechanik, Wirkungsweise der Kreiselpumpen, 4th edition 1998, Verlag W. Kohlhammer, Berlin. Single-stage centrifugal pumps are preferred for the purposes of the invention.

In the case of a side channel pump space, a narrow impeller having open blades rotates in the housing in which not only the blades but also a side channel runs around the major part of the circumference. The liquid to be transported enters not into the axis but instead through a slit from the end face into the blade chambers, with the liquid already present in the chambers simultaneously being driven outward by the centrifugal force. In the region of the blade ends, the flow is diverted at the housing wall into the side channel where it follows a screw-like path and reenters the impeller after some distance. This process is repeated from, for example, 10 to 50 times, depending on the throughput, for a liquid particle on the way from the suction port to the pressure port.

In the blade chambers, the liquid is accelerated not only in a radial direction but also to the circumferential speed of the wheel. At this circumferential speed and the circulation speed superimposed thereon, the liquid particle goes over from the impeller into the side channel. Along the further screw-like path, the circulation component is slowed only little by friction against the wall while the circumferential component is greatly slowed, essentially only as a result of the pressure increase. The loss of kinetic energy of the resulting flow is compensated for every now and again in the impeller.

Side channel pumps have a lower efficiency than centrifugal pumps, but generate a greater transport pressure.

The drive shaft (6) can be driven by means of a magnetic coupling or a canned motor.

Magnetic coupling utilizes the forces of attraction and repulsion between permanent magnets in the two halves of the coupling to provide contactless and slip-free transmission of torque. Between the two magnet-equipped halves of the coupling, there is a gap tube which separates the product space from the surroundings.

The canned motor is an electric motor in which rotor and stator are separated by a gap tube. The gap tube is located in the gap between stator and rotor of the motor.

In the pumps P to be used according to the invention, the drive shaft (6) is located entirely in the pump space (3). There is then no need for a seal between drive shaft (6) and pump space (3). However, the drive shaft (6) has to be mounted in the pump space (3) using sliding bearings (5).

In the present text, the term sliding bearing refers quite generally to a machine element for supporting or guiding machine parts which move relative to one another and taking up the forces arising and transferring them to the housing, component or foundation.

In a sliding bearing, the two parts which move relative to one another slide relative to one another against the resistance due to sliding friction. For use in pumping, ceramic materials are frequently used for the sliding bearings.

The present invention is based on the recognition that the silicon carbide frequently used as material for sliding bearings promotes the undesirable polymerization of (meth) acrylic monomers. On the other hand, this effect does not occur when using tungsten carbide for this purpose.

Tungsten carbide can be produced directly from the elements. Here, the carbon atoms are taken up between the lattice sites of the tungsten.

EXAMPLES

Example 1 (not According to the Invention)

A gaseous product gas mixture having the following composition was produced by two-stage catalytic gas-phase oxidation of propylene by molecular oxygen:
9.84% by weight of acrylic acid,
0.4% by weight of acetic acid,
4.4% by weight of water,
0.11% by weight of acrolein,
0.21% by weight of formaldehyde,
0.07% by weight of maleic anhydride together with, as balance to 100% by weight, propionic acid, furfural, propane, propene, nitrogen, oxygen and carbon oxides.

This gaseous product gas mixture was cooled in a spray cooler (direct cooler, quench) by spraying in crude acrylic acid (4000 l/h) (the temperature of the crude acrylic acid was 95° C.; the crude acrylic acid used for direct cooling comprised, as initial concentrations, 1.1% by weight of water and 0.1% by weight of phenothiazine as polymerization inhibitor). The crude acrylic acid used for quenching was circulated via a heat exchanger by means of a circulation pump and every now and again brought back to 95° C.

A centrifugal pump model MKP 32-160 (CP-Pumpen AG, Zofingen, Switzerland) was used as circulation pump for the quench. Pump space and drive space are separated by a metal wall. The drive in the pump space was effected via a magnetic coupling. The drive shaft was mounted horizontally in the pump space using a sliding bearing composed of silicon carbide.

The cooled gas mixture, which comprised the acrylic acid to be separated off, leaving the spray cooler was fed underneath the lowermost tray into a rectification column which was equipped with 27 bubble cap trays and with a spray condenser at the top of the column. The temperature at the top of the column was 20° C. and the temperature at the bottom of the rectification column was 90° C.

The condensate obtained in the spray condenser, which consisted mainly of water, was discharged and, after addition of 0.03% by weight of hydroquinone and cooling in a heat exchanger, returned as spray liquid having a temperature of 17° C. via the spray condenser to the uppermost column tray as runback. The reflux ratio was 4.

The crude acrylic acid obtained at the bottom of the rectification column was partly discharged (430 g/h), partly (250 g/h) recirculated, after addition of 0.1% by weight of phenothiazine for the purpose of polymerization inhibition, to the rectification column on the 13th tray of the column (counted from the bottom) and partly (about 15 l/h) firstly conveyed through a heat exchanger and then recirculated at a temperature of 100° C. to the zth tray of the column (counted from the bottom) to set the column temperature.

A further part of the crude acrylic acid obtained at the bottom of the column was fed under level regulation at a temperature of 102° C. to the quench via a heat exchanger preceding the quench for the purpose of liquid equalization in the quench.

The discharged crude acrylic acid comprised 97.2% by weight of acrylic acid, 1.6% by weight of acetic acid, 0.024% by weight of propionic acid, 0.4% by weight of maleic acid, 0.005% by weight of acrolein, 0.02% by weight of furfural and 1.2% by weight of water and also 0.05% by weight of phenothiazine and 0.03% by weight of hydroquinone.

The centrifugal pump had been blocked by polymer formation within an operating time of less than 10 hours.

Example 2 (According to the Invention)

The procedure of Example 1 is repeated. The sliding bearings composed of silicon carbide are replaced by sliding bearings composed of tungsten carbide. The process can be operated without interruption.

Example 3

1% by weight of silicon carbide (SiC) or 1% by weight of tungsten carbide (WC) was suspended in commercial acrylic acid, stabilized with 200 ppm of hydroquinone monomethyl ether (MEHQ) and in each case stored for four hours at 80° C. The concentration of hydroquinone monomethyl ether (MEHQ) was determined before and afterwards.

TABLE 1

MEHQ contents before and after storage at 80° C.

|                  | MEHQ content Beginning | MEHQ content End | MEHQ content Difference |
|---|---|---|---|
| Acrylic acid     | 193 ppm | 183 ppm | −5%  |
| Acrylic acid + WC | 193 ppm | 168 ppm | −13% |
| Acrylic acid + SiC | 193 ppm | 52 ppm  | −72% |

In the presence of silicon carbide, the polymerization inhibitor was consumed very quickly.

Example 4

1% by weight of silicon carbide (SiC) or 1% by weight of tungsten carbide (WC) was suspended in commercial acrylic acid stabilized with 200 ppm of hydroquinone monomethyl ether (MEHQ). 0.5 ml of the respective mixture was placed in a 1.8 ml ampoule and stored at 120° C. in a convection drying oven.

In each test series, three ampoules were filled and tested for each mixture, with the average time to complete polymerization being assessed visually.

TABLE 2

Polymerization at 120° C.

|               | Polymerization time in the case of SiC | Polymerization time in the case of WC |
|---|---|---|
| 0.0% by weight | 131 minutes | 131 minutes |
| 0.2% by weight | 48 minutes  | 79 minutes  |
| 0.4% by weight | 38 minutes  | 65 minutes  |
| 0.6% by weight | 35 minutes  | 66 minutes  |
| 0.8% by weight | 29 minutes  | 55 minutes  |
| 1.0% by weight | 27 minutes  | 57 minutes  |

Silicon carbide destabilizes significantly more strongly than tungsten carbide.

The invention claimed is:

1. A method for transporting a liquid F by means of a pump P, where the liquid F comprises at least 10% by weight of a (meth)acrylic monomer, the pump P has a pump space, the pump space comprises at least one transport element for transporting the liquid F, the liquid F is fed into the pump space with an entry energy, the liquid F leaves the pump space with an exit energy which is greater than the entry energy, the transport element is connected to a drive shaft in such a way that the drive shaft can transmit a torque to the transport element, and the mounting of the drive shaft is effected by means of at least two sliding bearings in the pump space, wherein the sliding bearings are composed of tungsten carbide.

2. The method according to claim 1, wherein the liquid F comprises at least 60% by weight of a (meth)acrylic monomer.

3. The method according to claim 1, wherein the liquid F comprises at least 90% by weight of a (meth)acrylic monomer.

4. The method according to claim 1, wherein the (meth) acrylic monomer is acrylic acid, methyl acrylate, ethyl acrylate, n-butyl acrylate, 2-ethylhexyl acrylate, 4-hydroxybutyl acrylate or cyclohexyl acrylate.

5. The method according to claim 1, wherein a temperature of the liquid F is from 10 to 120° C.

6. The method according to claim 1, wherein a temperature of the liquid F is from 50 to 90° C.

7. The method according to claim 1, wherein the liquid F comprises a polymerization inhibitor.

8. The method according to claim 7, wherein the polymerization inhibitor is hydroquinone monomethyl ether, phenothiazine, 4-hydroxy-2,2,6,6-tetramethylpiperidin-1-oxyl, hydroquinone or N,N'-di-sec-butyl-p-phenylenediamine.

9. The method according to claim 1, wherein the liquid F comprises from 0.001 to 1% by weight of a polymerization inhibitor.

10. The method according to claim 1, wherein the liquid F comprises from 0.01 to 0.1% by weight of a polymerization inhibitor.

11. The method according to claim 1, wherein force transmission to the drive shaft is effected by means of a magnetic coupling or a canned motor.

12. A pump P with liquid F, wherein the liquid F comprises at least 10% by weight of a (meth)acrylic monomer, the pump P has a pump space, the pump space comprises at least one transport element for transporting the liquid F, the liquid F is fed into the pump space with an entry energy, the liquid F leaves the pump space with an exit energy which is greater than the entry energy, the transport element is connected to a drive shaft so that the drive shaft can transmit a torque to the transport element, mounting of the drive shaft is effected by means of at least two sliding bearings in the pump space and the sliding bearings are composed of tungsten carbide.

13. The pump P according to claim 12, wherein the transmission of force to the drive shaft is effected by means of a magnetic coupling or a canned motor.

14. The method of using of a pump P for transporting a liquid F, wherein the liquid F comprises at least 10% by weight of a (meth)acrylic monomer, the pump P has a pump space, the pump space comprises at least one transport element for transporting the liquid F, the liquid F is fed into the pump space with an entry energy, the liquid F leaves the pump space with an exit energy which is greater than the entry energy, the transport element is connected to a drive shaft so that the drive shaft can transmit a torque to the transport element, mounting of the drive shaft is effected by means of at least two sliding bearings in the pump space and the sliding bearings are composed of tungsten carbide.

15. The method of using according to claim 14, wherein the transmission of force to the drive shaft is effected by means of a magnetic coupling or a canned motor.

* * * * *